May 6, 1969         S. T. HEIFETZ         3,442,368
TRAY CONVEYORS
Filed Jan. 26, 1967
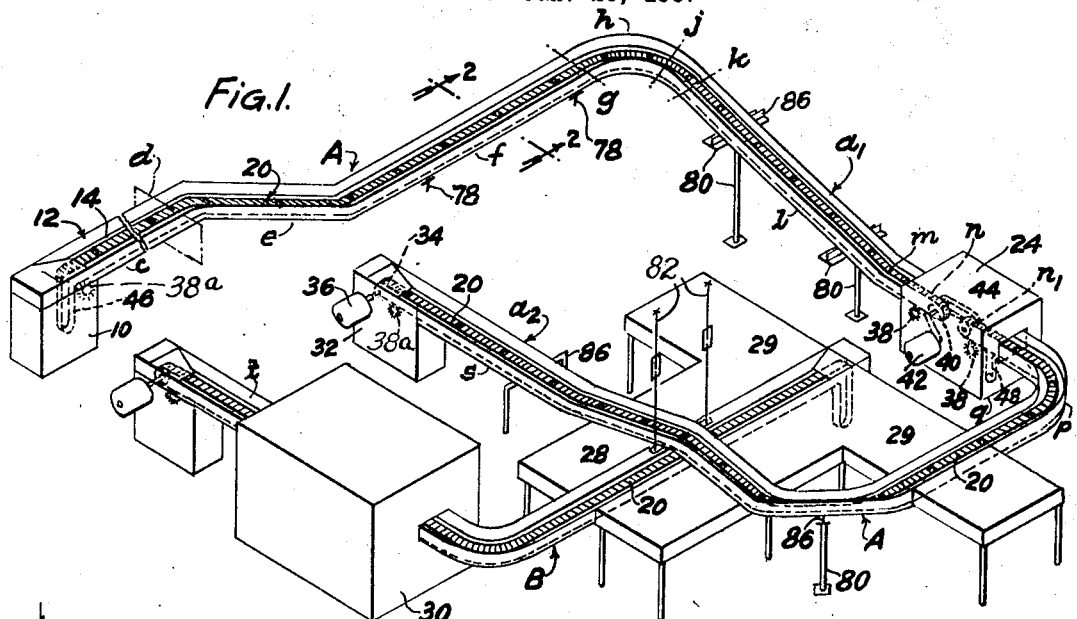
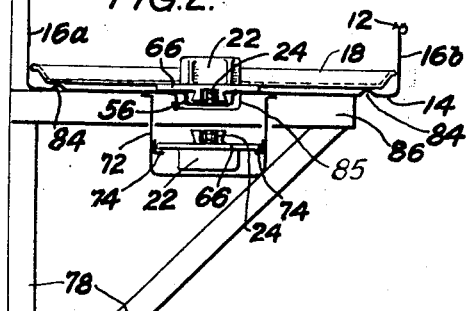
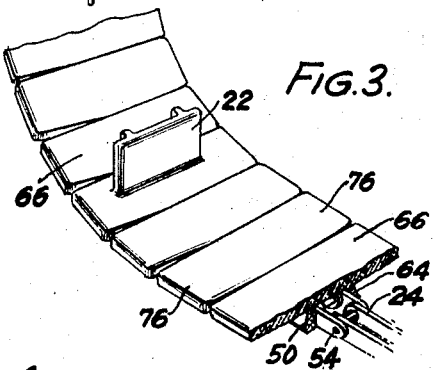
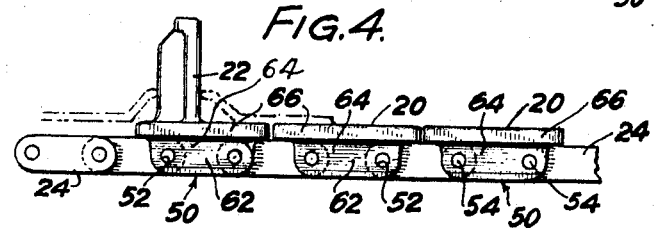
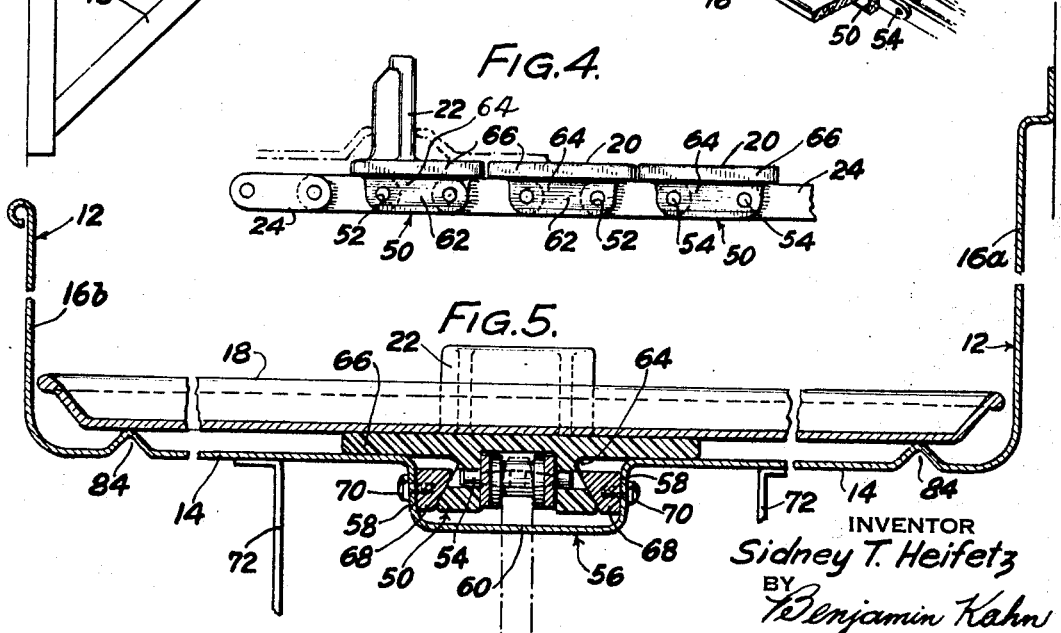
INVENTOR
Sidney T. Heifetz
BY
Benjamin Kahn
ATTORNEY

United States Patent Office 3,442,368
Patented May 6, 1969

3,442,368
TRAY CONVEYORS
Sidney T. Heifetz, New York, N.Y., assignor to Heifetz Metal Crafts, Inc., a corporation of New Jersey
Filed Jan. 26, 1967, Ser. No. 612,764
Int. Cl. B65g *17/06*
U.S. Cl. 198—197             3 Claims

ABSTRACT OF THE DISCLOSURE

A tray conveyor with an integral and continuous tray-guiding trough for laterally confining trays that are propelled by flights underneath the trays that are carried by an endless chain adapted to negotiate turns, inclined, declined and helical runs steeper than the friction angle between the trays and the flights with the use of equally spaced upward projecting pushers on certain flights and without the use of the pushers along horizontal runs. The chain is adapted to be sprocket driven and adapted to run in a chain-guiding trough integrally formed in the bottom of the tray-guiding trough, the trays being free to move vertically, sidewise or tilt with respect to its propelling flights. The bottom of the tray trough is adapted to suspendingly support the flights on the return runs.

---

This invention relates to "unitary," continuous, "omni-directional," tray-guiding conveyors, and more particularly to "sanitary," endless-link, chain-belt tray pusher type of flight conveyors adapted to operate in combination and in conjunction with a "sanitary," unitary type of "omni-directional," integral tray-guiding trough of the character required in food and dish-handling tray-service facilities.

This invention is especially useful in eating establishments where trays are used by patrons in obtaining their food and particularly where self-bussing is permitted; where a return tray trough is made conveniently accessible in the dining area to receive trays loaded with soiled dishes and refuse for transporting to a separate area for further appropriate handling.

One of the principal objects of the invention is the provision of an efficient, economical and readily adaptable sanitary type tray-trough and conveyor link-chain of flight-like character capable of supportingly transporting a series of definitely spaced trays of dishes, clean or soiled, rapidly and safely to or from a dining area in a series of contiguous runs of horizontal and inclined ascending and descending paths, including turns or in angular directions in the horizontal or inclined to arrive at regularly spaced intervals at stations or facilities along or through which the chain of the conveyor is adapted to pass.

Another important object of the invention is the provision of such above-mentioned conveyor systems that are simple in their adaptation and installation to any desired operational optimum path of travel pattern, and easily supported along the run courses, and wherein the tray-troughs are adaptable to internally support the chained flights and guide the trays laterally and externally support the returning flight-like links thereunder.

The term "unitary" as used above is to distinguish from such conveyors or converor systems where trays are transferred from one endless chain or belt to another at points of change of direction of tray travel, such as from horizontal to vertical or vice versa, or at horizontal transfer points at flat turns or at inclined transfer points including helical runs, except where similar adjacent endless conveyors are geared in tandem to avoid excessive strain in tension when of excessive length.

The term "sanitary" is used to distinguish from such systems that are not used in the food service industry, are not subject to self-service by the public, and do not require their coming under public safety code requirements nor under the strict N.S.F. (National Sanitation Foundation) Code containing discriminating constructional and functional requirements relating particularly to cleanability and sanitation especially where public handling of trays and self-bussing is permitted.

The term "continuous" is used to distinguish from such conveyors or conveyor systems where abrupt changes in direction and changes in lineal speeds or change in the nature of the carrier elements, or any one or more of these variations is inherent in the system.

Conventional tray-pushing endless belt tray carriers used in the above mentioned establishments are generally of the projecting-pin chain type wherein a vertical pin projects from a relatively narrow continuous slot exposed in the bottom of an open tray-guiding channel. In such constructions the open slot and the chain trough and links are subject to accumulation of debris, difficult to clean and affords easy entree and lodgement for vermin.

Other conventional tray-carrying conveyors, not of the tray-pushing variety are generally flat-topped full width endless belts, or fashioned of flat-top linked flights, both of which forms are capable of passing under the trays should they for any reason or purpose be slowed or stopped. In such flat-top constructions, the friction between the carrier and the trays is the only means of propulsion and therefore these types of conveyers are confined to the horizontal or at best to very slight inclinations well below the friction angle of the engaging surfaces, beyond which the trays will either not move up the incline or will slide by themselves down the declined paths.

This invention is particularly concerned with such food-tray conveying devices having relatively narrow flight belts adapted to carry and propel relatively wide and overhanging trays that extend substantially outward and beyond the ends of the flights and widthwise of the flight belt.

The unique features of the invention as will be more fully seen in the following description provide these general advantages:

(1) High adaptability in design planning and selection of optimum trough travel paths for efficient utilization of space in the kitchen area and the approaches thereto as well as convenience of tray handling in the dining area.

(2) High adaptability where inclined and declining running troughs are necessary to avoid built-in obstructions and to turn a horizontal or inclined run;

(3) The provision of a compartmentalized belt to insure delivery of trays at equal unit distances apart or spaced apart at distances in whole multiples of said unit distances.

Other objects and advantages of the invention will appear in the following description of an illustrated embodiment thereof, it will also be seen that modifications may be made without departing from the invention as specified in the claims here appended.

In the drawing:

FIG. 1 is schematic perspective view of a general tray handling trough system containing the invention.

FIG. 2 is a section taken substantially along line 2—2 of FIG. 1.

FIG. 3 is a fragmentary perspective view of a portion of the link chain-belt with flights of the character employed in FIGS. 1 and 2 thereon in relative position in negotiating a turn.

FIG. 4 is a fragmentary end view of a length of chain having a series of flights thereon, one of said flights being of the pusher type seen in the previous figures.

FIG. 5 is an enlarged sectional view similar to that appearing in FIG. 2, but looking in the opposite direction.

The invention will be described in connection with an endless chain conveyor system or systems arbitrarily selected for illustration although the invention does not particularly reside in the system or systems per se, but rather forms an essential integral part of such systems.

Referring to FIG. 1, two overlapping unitary systems of endless belt conveyors A and B are shown as cooperating in an establishment where trays are received at one level and conveyed to another level for segregating of refuse, sorting, dishwashing and other cleaning operations are performed. The system A is composed of two sub-systems $a_1$ and $a_2$, tied together in tandem and in running continuity, their separation and rejoining with independent driving power sources being merely to reduce the strain of excessive tension due to excessive length.

While the runs in the sub-system $a_1$ of the system A is shown as conveying the trays downward to a lower level as directed by the trough's paths, it can be readily seen that transport of trays to an upper level is by the same token as readily accomplishable. The omni-directional versatility of the invention is illustrated only in the system A. However the elements giving such versatility are also inherent in the system B although not illustratively employed, except to show the negotiation of a flat turn and its adaptability to pass through a washing machine. The vital characteristics of the invention relating to sanitation cleaning and other aspects for guiding and advancing the trays are equally contained in both systems.

Still referring to FIG. 1, a suitable stand 10 in the dining area of the establishment supports the end of sheet metal trough 12, preferably made of stainless steel, is formed with a bottom wall 14 and integral upright opposing side walls 16a and 16b spaced apart to permit the easy placement and entry while the systems are running, of an oblong shallow tray 18, long-ways or short-ways as purposely provided for, but not either-ways. These trays may be of any commercially available standard sizes. At this upper level and along the horizontal run $c$ in the dining area, the trays may therefore be placed in the trough on top of contiguous travelling flights 20 and runwise between upright pusher elements 22 projecting upwardly from certain flights at spaced intervals thereof. The travelling flights are attached to an endless chain 24 in any suitable manner, and are of two types, a flat-top type and a pusher type. These are identical except for the pusher element 22. The identities comprising an oblong plate element adapted to be disposed transversely along the top of the link-chain 24 and adapted to slide on the top surface of the bottom wall 14 of the trough, and the downward projecting lobes adapted to ride a channel-shaped trough in the bottom wall of the tray-trough. These lobes may be part of such above-mentioned flights that pivotally interconnect in chain fashion as with the chain, when the pulling load is light.

As illustrated the trough run $c$ is adapted to pass through an opening $d$ in a wall separating the rest of the system from the tray receiving trough part of the run $c$. Continuing from the run $c$, the trough run $e$ is shown as declining to a level along the ceiling of the story below and along a run $f$. At place $g$, the trough is shown as making a right turn along $h$ to about the place $j$ whereafter the turn declines helically to $k$ where it is horizontally tangent to a continuing declining straight run at $l$ which at its end curves with normal curves of the link-chain as at $m$ to a horizontal run along $n$, into a casing 24 to be described later herein. These normal chain curves are directed by the curvature of the trough at these points, and flight guides as are to be later described in more detail, are employed to keep the flights from lifting or rising from the bottom surface of the trough.

The run $n$, of the sub-system $a_1$, emerges from the casing as a continuing run $n_1$ in the sub-system $a_2$, at the same flight speed and at the same phase and pusher pitch as that prevailing in the entering run $n$ of the sub-system $a_1$. The run $n_1$ of sub-system $a_2$ takes a flat horizontal right turn at $f$ to the horizontal run $q$ extending across a table 26 where refuse is taken from the trays and where dishes and tableware are sorted and racked for further treatment. The trays are then arbitrarily shown as being carried around an inclined run $r$ including helical and normal chain turns, over and crossing a portion 28 of the work table 29 and down to a horizontal trough run $s$ where the tray may be removed for cleaning, whereafter, they are ready to be returned to service. Or the trays may be racked, as may the dishes, and run through the washing machine 30 to a removing trough $t$ and, thereafter, returned to service. The chain and flights then pass into a casing 32 in which there is a drive sprocket 34 and drive mechanism not shown, but well known in the art, and driven by a motor or the like.

The casing 24 contains two chain and flight washers represented by the brush symbols 38, one for each of the endless chain and flights of the sub-systems $a_1$ and $a_2$. Also contained in the casing 24, is a drive sprocket 40, driven by a motor or the like 42, for driving the sub-system $a_1$ chain and its flight means 44 also in this casing are adapted to unify the running speeds of the two sub-systems coming together within the casing. This means may be in the form of gearing or chain and sprockets or any other means well known in the art for maintaining equal lineal running speeds of the systems of endless belt character.

A take-up loop 46 for the system $a_1$ with its attendant mechanism, not shown but well known in the art, is indicated in the casing 10, and a similar take-up loop 48 for the sub-system $a_2$ is in the casing 24. Additional flight and chain belt washers as at 38a may be located in the casing 10 and in the casing 32 if desired.

The flights are preferably of plastic material of the character that has high strength and lubricity characteristics such as "nylon" or "Delrin." Also preferably, the flights are as shown molded and of integral character and provided with depending lobes 50 having holes 52 adapted to receive the ends of the chain pins 54 of the usual commercial type link-chain having inherent capabilities of flat bowing, that is, bowing in a flat plane wherein the pins in this plane can fan out to a limited radius. This is accomplished by inherent looseness and tapering of the pins within the confines of the inner flanks of the links. This bowing capability of the chain together with its normal ability are combinable to permit its taking a helical path but this must be directed and controlled in direction and degree. The curved and helical paths within the limits of their radii and pitch of helix is prescribed by the tray trough and its accouterments as will be seen in the further description thereof.

A U-shaped chain-trough 56 depends from the bottom wall 14 and comprises vertical walls 58 and an adjoining bottom wall 60, all integrally formed in the bottom wall 14 of the tray-trough 12. The lobes 50 are disposed outside the outer links of the chain and are adapted to flank the chain at alternate links with the inner surfaces of the lobes sandwiching the chain. The outer surfaces of the lobes are angulated as at 62 to form a dovetail between them, with the root or neck of the dovetail at 64 at the juncture with the underside of the plate portion 66 of the flights. At curves in the chain-trough there is provided curved runners 68 which are held in place with respect to the trough by screws 70 or the like. These runners are preferably made of low friction material to provide easy gliding retainers and guides of mating dovetail character as that of the lobes, retaining them against displacement as they are pulled around these bends and curves. The chain-trough 60 is disposed substantially midway of the tray trough 12, that is, midway of the upright walls thereof. In this way the pusher uprights are disposed midway of the trays that are being pushed or those that are being retarded down declines.

After completing the tray contacting runs, at the end of these runs, as seen in FIG. 1, the chain is adapted to pass around a toothed or idler sprocket or pulley, as the case may be, and start its return runs, mainly under the tray-trough and substantially directly under the chain-trough thereof.

Attached to the underside of the tray-trough and depending therefrom are a plurality of spaced, stiff trapeze-like hangers 72 adapted to support continuous, spaced rails 74 which in turn are adapted to slidingly support the flight plates at or near their ends in their inverted position in their return runs. The portions at the ends of the flights on the tray carrying surfaces which are preferably roughened may be devoid of such roughness at areas 76 (FIG. 3) to better slide upon the return rails 74.

Knee braced wall brackets 78, perch type floor supports 80, and turnbuckle-trapeze type hangers 82 are used as shown to support the tray-troughs, the bottom wall 14 of which is readily adaptable to such type of supports. The horizontal trough-supporting arms of the knee braces are provided with suitable cutouts as at 85 to permit the reception of the depending chain-trough 56.

The plate portions 66 of the flights are, for reasons of economy mostly, as short as is feasibly practical, and as a result are much shorter than even the short dimension of a tray of the character here employed. Therefore the tray overhangs the flight plates at both ends thereof. When the trays are heavily and unevenly laden, tipping may occur. To avoid tipping, the bottom of the tray-trough, at or near the outward reaches of the end of the tray, as best seen in FIG. 5, is provided with rails 84, struck up from the wall bottom to a height just barely touching the tray bottom. Any drag induced upon the travelling tray under tippable circumstances will tend to spin the tray but, due to the small clearances provided between the edges of the tray and the adjacent vertical walls of the trough; the tray cannot snub or jam and an otherwise tippable tray continues along under the influence of its pusher flight. Substantially the same conditions prevail along turns, curves and helical runs.

Under the described construction it is seen that the tray is transversely guided in its longitudinal path by the prescribed tray-trough path via its vertical side walls, and the chained flights are guided by the chain-trough. By this means any lateral deviation between the tray and the flights is taken up by relative sliding between them.

Having thus described the invention in general and in detail to point out the novelty and principles contained therein, it can now be seen that modifications may be had without departing from the spirit of the invention as claimed.

What I claim is:

1. In a tray conveyor of the character described the combination of a U-shaped tray-trough adapted to loosely receive and guide a food tray placed therein while the conveyor is running, said tray-trough providing smooth, continuous, uninterrupted and sanitary longitudinal conveying runs for said trays, said tray-trough including inclines, declines, corner turns and helical runs, said tray a bottom with integral upwardly extending and spaced apart side walls, said bottom also having an integrally formed, substantially narrow and downwardly extending chain-trough disposed midway between said side walls, and a series of chain connected tray supporting flights positioned to ride in said chain-trough and adapted to carry trays placed in said tray-trough and upon said moving flights, said flights having depending portions in said chain-trough to guide the flights laterally in their travel along the said longitudinal courses, certain of said flights, at equal distances greater than a standard sized tray length, having pusher means extending upward to a level substantially higher than the top of standard sized tray to positively engage and propel any lagging trays, whereby said trays are periodically and positively advanced while free to adjustingly orientate with respect to said flights and said side walls in the course of traversing said runs.

2. In a tray conveyor of the character described the combination as set forth in claim 1 including means underneath the bottom wall of said tray-trough for suspendingly supporting the return runs of said flights.

3. In a tray conveyor set forth in claim 2 including means for slidingly supporting said flights along the upper surfaces and along the lateral areas thereof.

References Cited

UNITED STATES PATENTS

| | | | |
|---|---|---|---|
| 2,857,043 | 10/1958 | Eden | 198—189 X |
| 2,884,118 | 4/1959 | Williams | 198—189 |
| 3,262,550 | 7/1966 | Kampfer | 198—189 |
| 3,269,523 | 8/1966 | Creswell | 198—189 X |
| 3,270,862 | 9/1966 | Goldberg | 198—189 |
| 3,292,772 | 12/1966 | Rice | 198—204 |

RICHARD E. AEGERTER, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,442,368

May 6, 1969

Sidney T. Heifetz

It is certified that error appears in the above identified patent and that said Letters Patent are hereby corrected as shown below:

Column 6, line 12, after "tray" insert -- -trough having --.

Signed and sealed this 14th day of April 1970.

(SEAL)
Attest:

Edward M. Fletcher, Jr.
Attesting Officer

WILLIAM E. SCHUYLER, JR.
Commissioner of Patents